(12) United States Patent
Wedman et al.

(10) Patent No.: US 9,425,664 B2
(45) Date of Patent: Aug. 23, 2016

(54) COMPOSITE STATOR FOR ELECTROMECHANICAL POWER CONVERSION

(71) Applicant: ThinGap, LLC, Ventura, CA (US)

(72) Inventors: Leonard N. Wedman, Santa Barbara, CA (US); Evan E. Frank, Goleta, CA (US); Donald A. Harris, Ventura, CA (US)

(73) Assignee: ThinGap, LLC, Ventura, CA (US)

( * ) Notice: Subject to any disclaimer, the term of this patent is extended or adjusted under 35 U.S.C. 154(b) by 401 days.

(21) Appl. No.: 13/802,715

(22) Filed: Mar. 14, 2013

(65) Prior Publication Data

US 2013/0300241 A1  Nov. 14, 2013

Related U.S. Application Data

(60) Provisional application No. 61/644,976, filed on May 9, 2012.

(51) Int. Cl.
| | |
|---|---|
| *H02K 3/04* | (2006.01) |
| *H02K 3/47* | (2006.01) |
| *H02K 3/28* | (2006.01) |
| *H02K 1/27* | (2006.01) |
| *H02K 15/04* | (2006.01) |

(52) U.S. Cl.
CPC .. *H02K 3/28* (2013.01); *H02K 1/27* (2013.01); *H02K 3/04* (2013.01); *H02K 3/47* (2013.01); *H02K 15/04* (2013.01); *H02K 15/0492* (2013.01); *Y10T 29/49009* (2015.01)

(58) Field of Classification Search
CPC ............. H02K 3/26; H02K 3/28; H02K 3/04; H02K 3/47; H02K 5/128
USPC ...................... 310/43, 45, 208, 266
See application file for complete search history.

(56) References Cited

U.S. PATENT DOCUMENTS

| | | | | |
|---|---|---|---|---|
| 4,507,628 A | * | 3/1985 | Kameya | H03H 7/32 333/138 |
| 4,556,811 A | * | 12/1985 | Hendricks | H02K 3/47 310/208 |

(Continued)

FOREIGN PATENT DOCUMENTS

| | | |
|---|---|---|
| WO | 2010148472 A1 | 12/2010 |
| WO | 2011040982 A1 | 4/2011 |

OTHER PUBLICATIONS

International Search Report dated Sep. 10, 2013 regarding PCT/US2013/040203. (IPRP and Written Opinion, Int'l Search Report, plus references from Int'l Search Report, previously provided in Nov. 5, 2013 IDS for this application).

(Continued)

*Primary Examiner* — Tran Nguyen
(74) *Attorney, Agent, or Firm* — Arent Fox LLP

(57) ABSTRACT

A rotating electromechanical apparatus includes a cylindrical ironless stator coil comprising a plurality of wires, a magnetic rotor arranged with the stator coil, wherein the magnetic field flux associated with the rotor interacts with the stator coil wires by electromagnetic induction, a cylindrical bobbin arranged to support the wires, a strand woven on at least the outer circumference of the wire-wrapped cylindrical bobbin, and a curable potting material potting the wires, bobbin and strand to provide an ironless composite stator coil when cured.

8 Claims, 13 Drawing Sheets

(56) References Cited

U.S. PATENT DOCUMENTS

| | | | |
|---|---|---|---|
| 4,731,554 A | 3/1988 | Hall et al. | |
| 4,883,981 A | 11/1989 | Gerfast | |
| 5,172,021 A | 12/1992 | Takahashi et al. | |
| 5,579,188 A * | 11/1996 | Dunfield et al. | 360/99.08 |
| 5,646,465 A | 7/1997 | Paweletz | |
| 5,698,912 A | 12/1997 | Rasch et al. | |
| 5,882,182 A | 3/1999 | Kato et al. | |
| 6,012,909 A | 1/2000 | Sloteman et al. | |
| 6,111,329 A * | 8/2000 | Graham | H02K 3/26 29/598 |
| 6,129,529 A | 10/2000 | Young et al. | |
| 6,191,511 B1 | 2/2001 | Zysset | |
| 6,384,494 B1 | 5/2002 | Avidano et al. | |
| 6,447,269 B1 | 9/2002 | Rexroth et al. | |
| 6,624,542 B1 | 9/2003 | Gabrys et al. | |
| 6,759,786 B2 | 7/2004 | Horng et al. | |
| 6,873,085 B2 | 3/2005 | Graham et al. | |
| 7,193,342 B2 | 3/2007 | Casey et al. | |
| 7,525,230 B1 | 4/2009 | Gabrys | |
| 7,528,511 B2 | 5/2009 | Smith | |
| 7,557,486 B2 | 7/2009 | Choi et al. | |
| 7,622,832 B2 * | 11/2009 | Moriyama | G03F 7/70758 310/12.22 |
| 7,687,969 B2 | 3/2010 | Kim et al. | |
| 7,750,515 B1 | 7/2010 | Gabrys | |
| 7,759,828 B2 | 7/2010 | Zhong | |
| 7,791,238 B2 | 9/2010 | Pal et al. | |
| 7,830,064 B2 | 11/2010 | Lee et al. | |
| 7,888,839 B2 | 2/2011 | Gabrys et al. | |
| 7,911,110 B2 | 3/2011 | Choi et al. | |
| 7,977,831 B2 | 7/2011 | De Filippis et al. | |
| 8,063,519 B2 | 11/2011 | Smith | |
| 8,220,295 B2 | 7/2012 | Choi et al. | |
| 8,339,010 B2 | 12/2012 | Atarashi et al. | |
| 8,637,771 B1 | 1/2014 | Yankie et al. | |
| 2006/0017339 A1 * | 1/2006 | Chordia | H02K 5/128 310/86 |
| 2007/0108852 A1 | 5/2007 | Bolsoy | |
| 2007/0174082 A1 | 7/2007 | Singh | |
| 2009/0191070 A1 | 7/2009 | Kawachi et al. | |
| 2010/0156231 A1 | 6/2010 | Lee et al. | |
| 2010/0289353 A1 | 11/2010 | Pal et al. | |

OTHER PUBLICATIONS

International Searching Authority for PCT Application No. PCT/US13/40203 dated Sep. 10, 2013 and Written Opinion of the International Searching Authority for PCT Application No. PCT/US13/40203.

EP Supplementary European Search Report and European Search Opinion dated Jan. 27, 2016, regarding EP13788581.0.

* cited by examiner

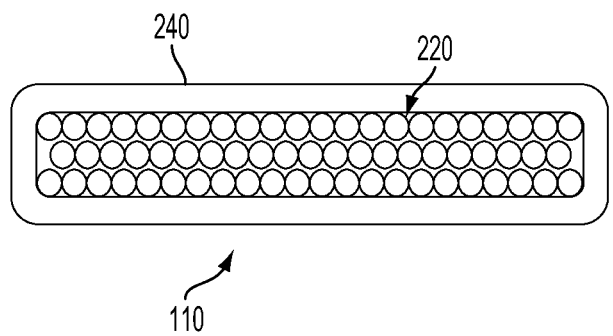
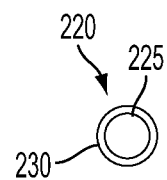
FIG. 10A
FIG. 10B
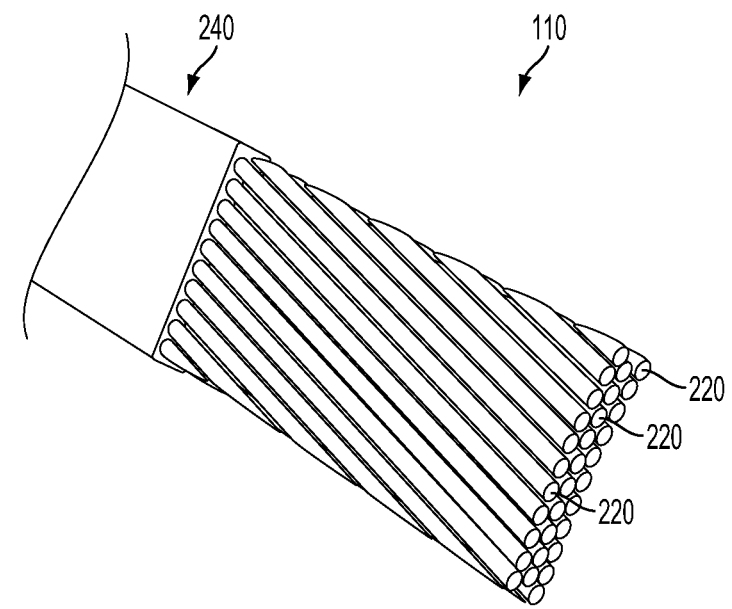
FIG. 11

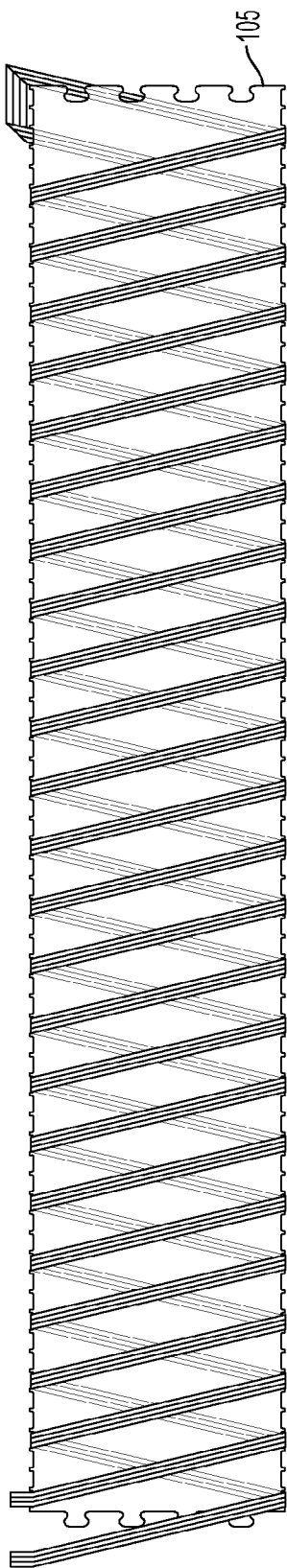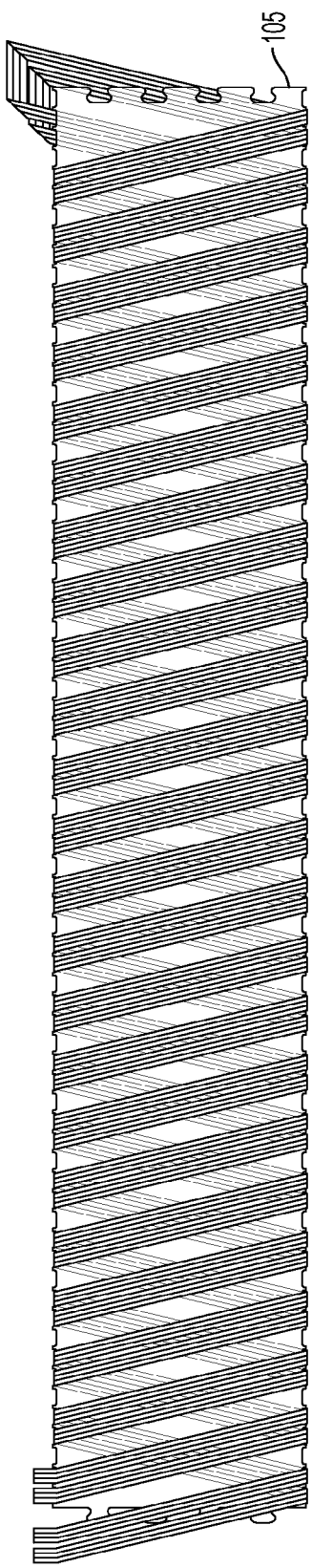

COMPOSITE STATOR FOR ELECTROMECHANICAL POWER CONVERSION

RELATED APPLICATIONS

This application claims benefit of priority of U.S. Provisional Patent Application No. 61/644,976, filed May 9, 2012, which is incorporated by reference into this application as if fully set forth herein.

BACKGROUND

1. Field

The present disclosure relates to electromechanical power conversion. More particularly, the disclosure relates to composite stator structures for ironless core motors and generators using Litz wires.

2. SUMMARY

In an aspect of the disclosure, a rotating electromechanical apparatus includes a composite ironless stator coil comprising a plurality of wires, a bobbin arranged to support the Litz wires, and a magnetic rotor arranged with the stator coil, wherein the magnetic field associated with the rotor interacts with the stator coil wires by electromagnetic induction.

In an aspect of the disclosure, a rotating electromechanical apparatus includes a composite ironless stator coil comprising a plurality of wires, a bobbin arranged to support the wires, and a magnetic rotor arranged with the stator coil, wherein the magnetic field associated with the rotor interacts with the stator coil wires by electromagnetic induction.

In an aspect of the disclosure, an ironless stator coil includes a plurality of wires, a planar form arranged as a cylindrical bobbin to support an arrangement of the wires wound around both sides of the planar form, wherein the wire wound planar form is arranged as a cylindrical bobbin, a tape or strand, such as a fiberglass strand, wrapped around either the interior, exterior, or both sides of the wire-wrapped cylinder, and a curable potting material encapsulating the bobbin, the strand and the wires, wherein the potting material, bobbin, strand, and wires form a rigid composite stator structure.

In an aspect of the disclosure, a method of manufacturing an ironless stator coil includes arranging a plurality of Litz wires on a planar form, wherein the Litz wires include braided filaments woven to have a cross-section aspect ratio of width-to-thickness that is greater than one, forming the planar form supporting the Litz wires into a cylindrical bobbin/Litz wire combination on a mandrel, wrapping the cylindrical bobbin/Litz wire combination with a strand or tape, encapsulating the combination with a curable potting material, and curing the potting material to form a rigid composite stator structure.

BRIEF DESCRIPTION OF THE DRAWINGS

FIG. 10A illustrates a cross-section of a Litz wire bundle.

FIG. 10B illustrates details of a cross-section of a Litz wire bundle.

FIG. 11 illustrates twisted filaments and insulation of a Litz wire bundle.

FIG. 22 is an illustration of a first phase of a three phase stator wound on a flat form of the bobbin.

FIG. 23 illustrates a second phase winding added adjacent to the first phase on the bobbin of FIG. 22.

DETAILED DESCRIPTION

Various concepts will now be presented with reference to a stator for an electric motor or electric power generator.

It is to be understood that the specific order or hierarchy of steps in the methods and processes disclosed is an illustration of exemplary processes. Based upon design preferences, it is understood that the specific order or hierarchy of steps in the methods may be rearranged.

Figure 1:
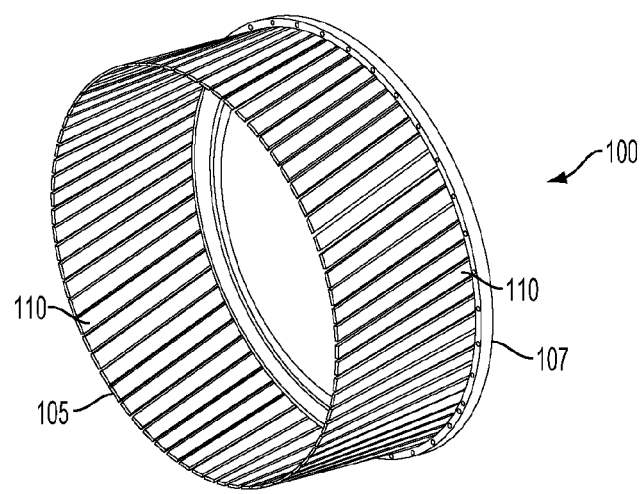
FIG. 1 illustrates a standalone ironless core stator in accordance with the disclosure.

FIG. 1 shows a conceptual representation of a stator 100 of the present disclosure. The stator coil 100 includes an arrangement of conductors 110 wound on a cylindrical structure 105 (a bobbin, described below) in a selected pattern. The conductors may be composed of Litz wire bundles (described below) or of individual wires or conductive metal tape. The stator includes an inner mounting ring (shown on inside diameter of left side of stator), and a phase ring (107). The phase ring 107 provides means for terminating conductors for multiple phase current induction as an array of magnets in the rotor spins concentrically in proximity to the stator conductor windings. For example, as shown in FIG. 1, the conductors are wound slanted at an angle with respect to the axis of the cylinder. However, other patterns of wire placement on the bobbin are possible.

Figure 2:
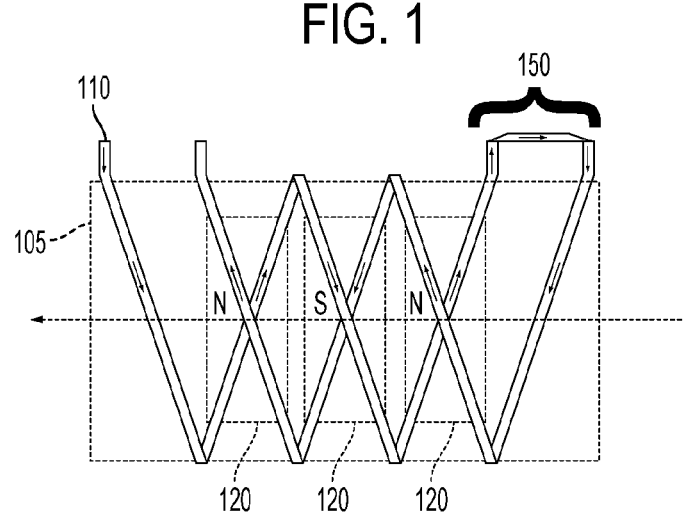
FIG. 2 illustrates a detail of one phase of a multiple phase wave winding on a flat form bobbin of the stator of FIG. 1 in accordance with the disclosure.

FIG. 2 shows a detail of a single phase of a multiple phase wave winding of a single conductor winding 110 on a flat form bobbin 105, presented in a planar view for illustration. Instantaneous current direction is shown by arrows in the conductor. Referring to FIG. 2, the illustration shows, for example, the two elements of current conductor 110 ("in" and "out") at the left front side of the bobbin 105, angled from upper left to lower right. The conductor elements are folded over the bobbin 105 at the lower edge and then are angled from lower left to upper right on the back side of the bobbin 105. The winding is continued until the end of the bobbin 105 is reached, and an interconnector 150 loops the current path back from the "in" portion of the conductor to the "out" portion. Interconnector 150 may be a continuous part of the winding, or may be a separate component attached to the conductors 110, such as a "buss" bar. Therefore, the winding 110 as shown in FIG. 2 may be a single element, or it may be two elements connected by the interconnector 150. In illustrations that follow (e.g., FIGS. 7, 17, 21-24) it may be understood that the "in" portion and the "out" portion of the conductors 110 may be provided by the interconnector 150 as described above, which are shown but not explicitly labeled.

For ease of illustration the conductor winding is shown with only three folds around the bobbin 105. The placement of conductor windings and the angle may be referred to as a "wave winding." Where the conductors on the front and back sides cross opposite each other, the currents are arranged to flow in the same vertical direction, whereas the horizontal directions are opposite. Magnets 120 on a rotor (not shown) face the stator with alternating north and south poles arranged to face alternating crossings of the front and back side conductors with the same periodicity. With this arrangement, magneto-electro-motive forces produced by relative motion of the rotor and stator 100 are additive around the common axis of the rotor and stator (when assembled in cylindrical fashion). The symmetric reversal of angles of the conductor elements with respect to the axis of rotation cancels forces parallel to the common axis.

Figure 3:
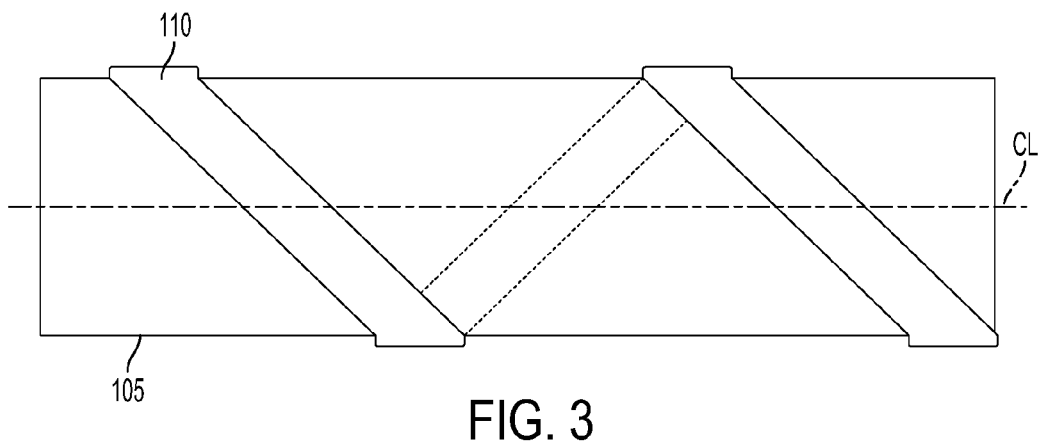
FIG. 3 illustrates a single litz conductor wrapped around a bobbin in accordance with the disclosure.
Figure 4:
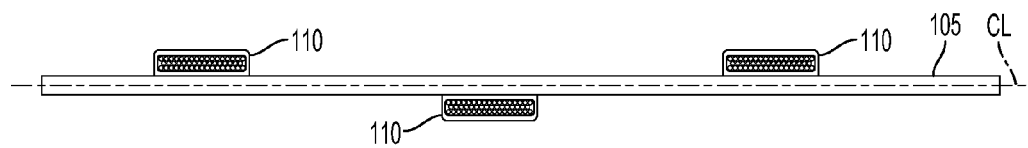
FIG. 4 illustrates a planar substrate for forming a bobbin in the stator of FIG. 1.

FIG. 3 illustrates a portion of the bobbin 105 and the conductor winding of FIG. 2, clearly indicating where the conductor 110 is on one side (in "front") of the bobbin 105, and folds over to the opposite side (in "back"). FIG. 4 presents an edge view of FIG. 3 through the line CL-CL', where it can be seen that the conductor 110 has a serpentine path wrapped around the bobbin 105.

Figure 5:
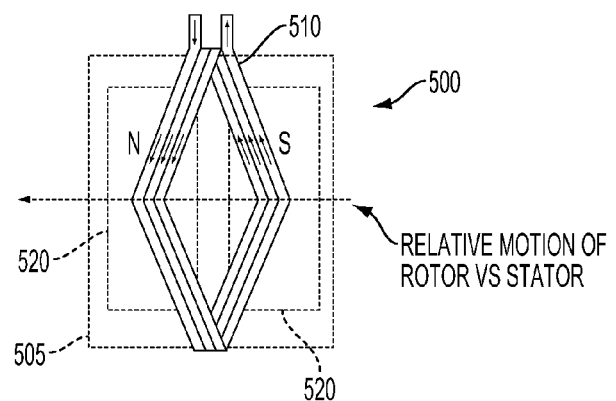
FIG. 5 illustrates a winding scheme for a detail of a single phase of a multi-turn three phase "chevron" winding pattern.

FIG. 5 illustrates a comparable winding scheme for a detail of a single phase of a multi-(3) turn three phase "chevron" winding pattern, with alternating pole faces of the rotor magnets 520 placed opposite the center of each chevron pattern 510. A feature of the arrangement of the windings is that the three wires (for a three-phase implementation) cross over each other at only one end of the bobbin 505. Thus, there are no wire crossovers anywhere else on the bobbin 505, and there is no excess wire extending past the edges of the bobbin 505 beyond the thickness of the wire bundle. Furthermore, referring to a three-phase arrangement of wire bundles 110, there are only six terminations—two for each wire bundle winding—at the opposite end of the length of the bobbin where the crossovers occur. Stators with conventional windings may have excess wire end turns at each end of the wires passing between the magnet poles of a rotor in order to facilitate wire cross-over and reversal of the direction of the wire.

In various embodiments, the wire bundle may be an individual wire, a bundle of wires, a Litz wire bundle, a metal tape, or the like.

For a three-phase stator 100 as an example, the plurality of wire bundles 110 may be dimensioned and slanted at a diagonal angle to be properly positioned in phase with respect to alternating magnetic flux of the rotor permanent magnets. When the bobbin is formed into a cylindrical structure, as shown in FIG. 1, the axial current reversal of each diagonal leg of a single wire bundle from wire on the outer surface to the same wire bundle on the inner surface also corresponds to a magnetic field reversal, so that the angular forces add circumferentially instead of cancel. Furthermore, by reversing the wire slant angle from the inner surface of the cylindrically arranged bobbin to that of the outer surface, the axial forces due to the crossed field-current vectors are cancelled.

Figure 6:
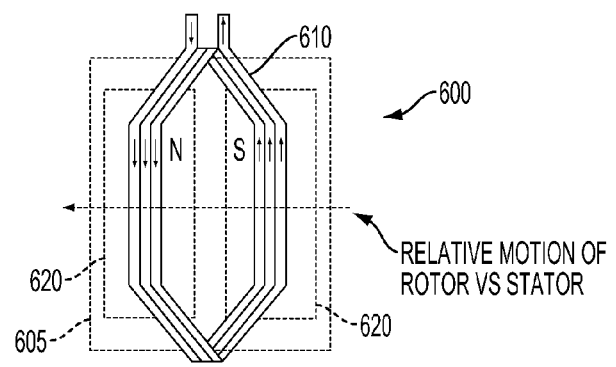
FIG. 6 illustrates a winding scheme for a detail of a single phase of a multi-turn three phase "lap" winding pattern.

FIG. 6 illustrates a comparable winding scheme for a detail of a bobbin 605 showing a single phase of a multi-(3) turn three phase "lap" winding pattern 610, with rotor magnetic pole faces placed opposite the center of each lap pattern. In this embodiment, the sections of conductor parallel to the axis of rotation generate no magneto-electromotive forces parallel to the axis of rotation of relative motion of the rotor and stator.

Figure 7:
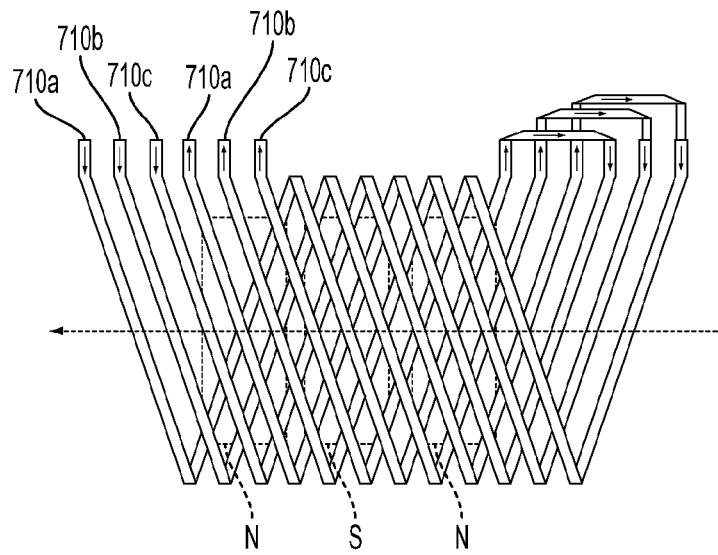
FIG. 7 illustrates details of a three phase wave winding relative to rotor magnet pole faces.

FIG. 7 illustrates the detail of a three phase wave winding relative to rotor magnet pole faces (bobbin not shown) to show the relationship between each phase of wire bundle windings 710a, 710b, 710c, and the magnet poles.

Figure 8:
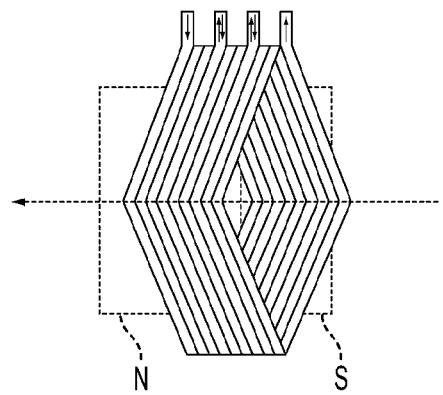
FIG. 8 illustrates details of a three phase multi-turn chevron winding relative to rotor magnet pole faces.

FIG. 8 illustrates the equivalent detail of a three phase multi-turn chevron winding. The apparent overlapping of the input of one phase with the output of the adjacent phase occurs on opposite sides of the bobbin (not shown), and do not make contact.

Figure 9:
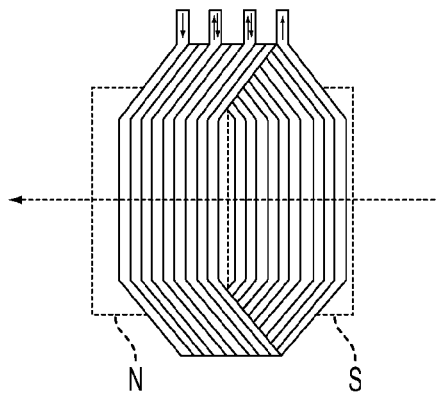
FIG. 9 illustrates details of a three phase of multi-turn lap winding relative to rotor magnet pole faces.

FIG. 9 illustrates the equivalent detail of a three phase multi-turn lap winding.

The conductors may be a plurality of Litz wire bundles 110, preferably configured, for illustrative purposes as rectangular Litz wire bundles 110, as shown in FIGS. 10A and 10B. However, other wire or wire bundle arrangements may be used. Litz wires are advantageously used in motors and generators with coreless stators, due to the reduced eddy current losses in wire filaments of small diameter or cross-section. Additionally, they are more flexible and better adapted to arranging on a stator 100 than individual wires having the same conductor density as the bundle 110. Referring to FIGS. 10A and 10B, individual wire filaments 220 include a conductor 225 have an insulation layer 230 surrounding each conductor 225. Rectangular shaped embodiments of wire filaments 220 have a higher packing fraction than round wire filaments, and thus have a greater conductor density. For illustration, round filaments are shown. The bundle may additionally have an insulating outer layer 240 surrounding the bundle.

As shown in the photographs of FIG. 11, in a type-8 Litz wire bundle 110, the insulated wire filaments 220 may be twisted or braided, with an advantage that each filament is subject to the same average magnetic field of a permanent magnet rotor averaged over the bundle length and over time when subjected to relative rotation between the rotor and the stator.

Figure 12:
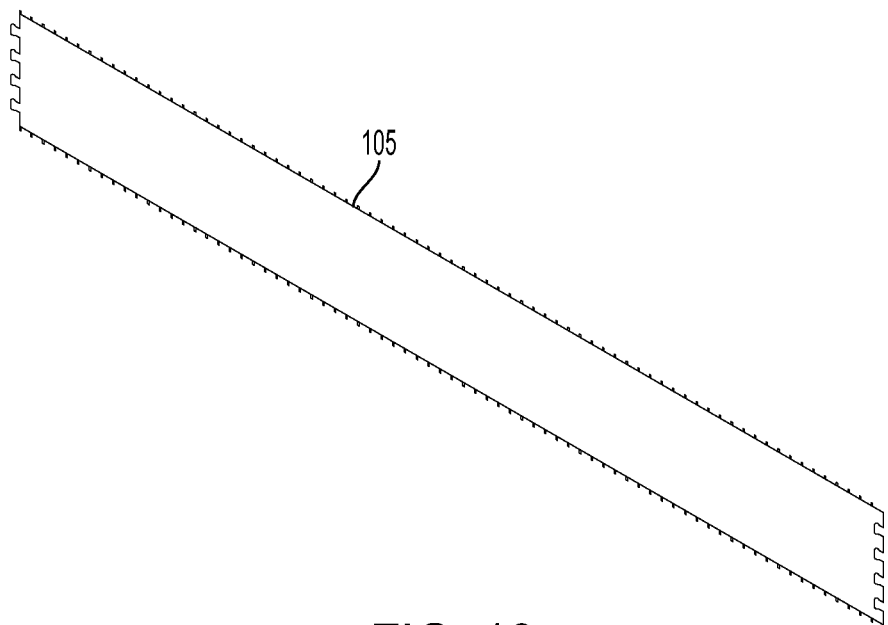
FIG. 12 illustrates a flat form of a composite stator bobbin.
Figure 13:
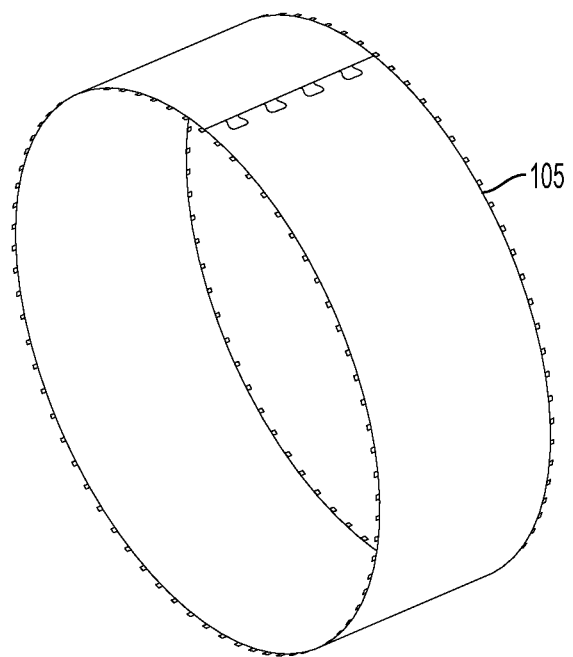
FIG. 13 illustrates the bobbin of FIG. 12 curved to form a cylinder.

In an embodiment, FIG. 12 illustrates the shape of the flat form of the wire bobbin 105. Tabs at the end of the long dimension interleave when the bobbin 105 is curved to form a cylindrical structure. FIG. 13 illustrates the bobbin 105 curved to form a cylinder, and is shown without wires wound on the bobbin 105.

Figure 14:
FIG. 14 illustrates an embodiment of a bobbin for a three phase wave winding pattern of conductors.
Figure 15:
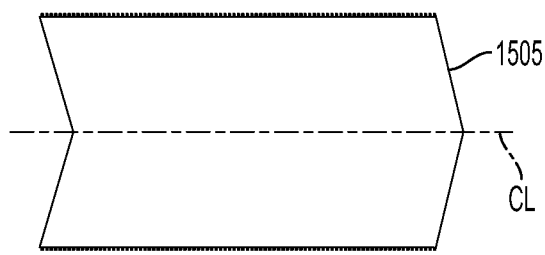
FIG. 15 illustrates an embodiment of a bobbin for a three phase chevron winding pattern of conductors.
Figure 16:
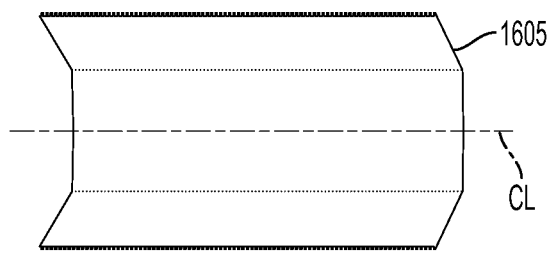
FIG. 16 illustrates an embodiment of a bobbin for a three phase lap winding pattern of conductors.

FIGS. 14 to 16 illustrate various additional embodiments of the bobbin 105, shown in flat form. FIG. 14 illustrates an embodiment of a bobbin 1405 for a three phase wave winding pattern of conductors. FIG. 15 illustrates an embodiment of a bobbin 1505 for a three phase chevron winding pattern. FIG. 16 illustrates an embodiment of a bobbin 1605 for a three phase lap winding pattern.

Figure 17:
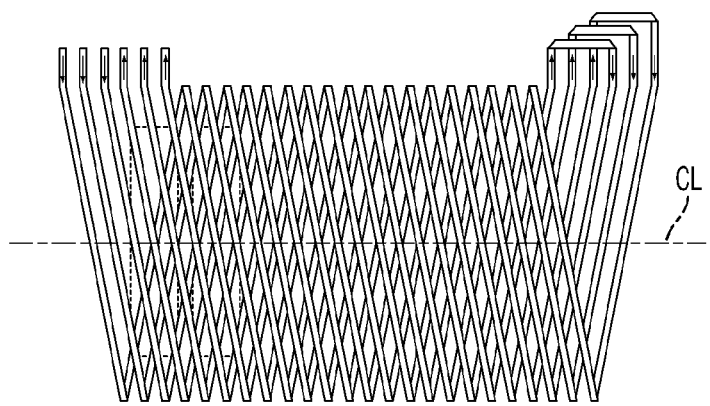
FIG. 17 illustrates an embodiment of wire paths for three phase wave winding on the bobbin of FIG. 14.
Figure 18:
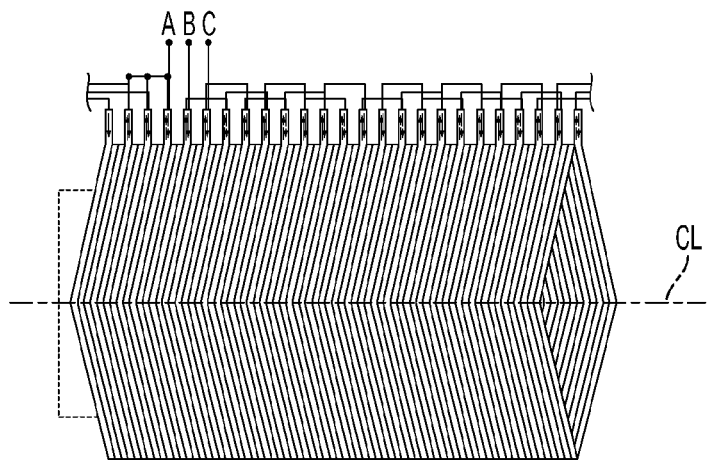
FIG. 18 illustrates an embodiment of wire paths for three phase multi-turn chevron winding on the bobbin of FIG. 15.
Figure 19:
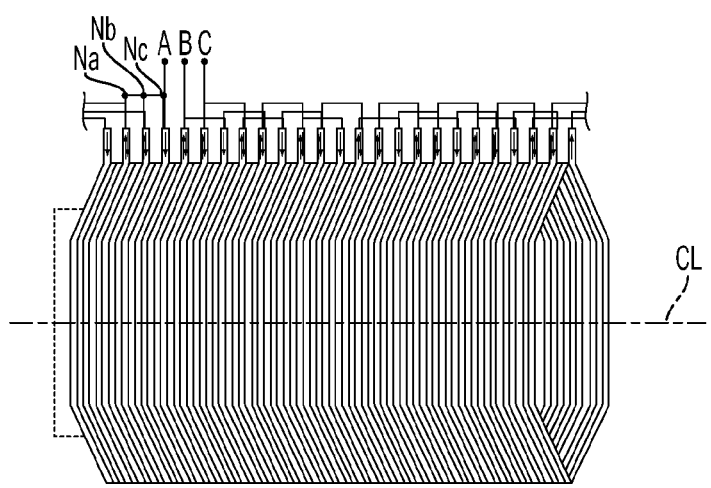
FIG. 19 illustrates an embodiment of wire paths for three phase multi-turn lap winding on the bobbin of FIG. 16.

The corresponding wire paths for three phase wave winding, three phase multi-turn chevron winding and three phase multi-turn lap winding are shown in FIGS. 17 to 19, respectively. The chevron winding configuration of the conductors are arranged so that the axial forces described above may be canceled. The lap winding configuration of the conductors are arranged to produce no axial forces, and the angled portions are arranged to cancel axial forces, as described above.

The bobbin 105 may be formed from a plastic, polymer, laminated, composite or other material, thin enough to be flexibly curved and bent along the greater dimension. Referring to FIG. 12, the bobbin 105 in flat form has a greater or long dimension (e.g., longitudinal) and a shorter or short dimension, the greater or long dimension being longer than the shorter or short dimension. The edges of the greater dimension have small guide tabs (or alignment pins) to locate and space the wire bundles as they are wound around the bobbin 105. Because Litz wire bundles 110 consist of many smaller wire filaments 220 that are highly flexible, Litz wire bundles 110 may be bent around the edge, between the guide tabs (or alignment pins), with a small radius of curvature, thus minimizing any path length to accommodate the reversal of direction from one side of the bobbin 110 to the other at the edge. However, as described above, other wire types and conductive metallic tapes may be used.

Figure 20:
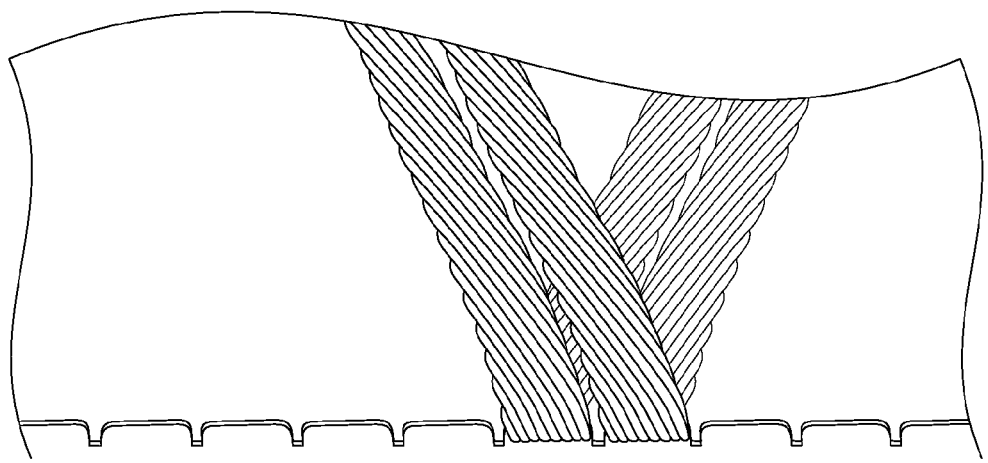
FIG. 20 is a photograph of two Litz wire bundles wrapped around the edge of a bobbin.

FIG. 20 is a photograph of two Litz wire bundles wrapped around the edge of the bobbin. The guiding tabs control the location and spacing of the bundles.

Figure 21:
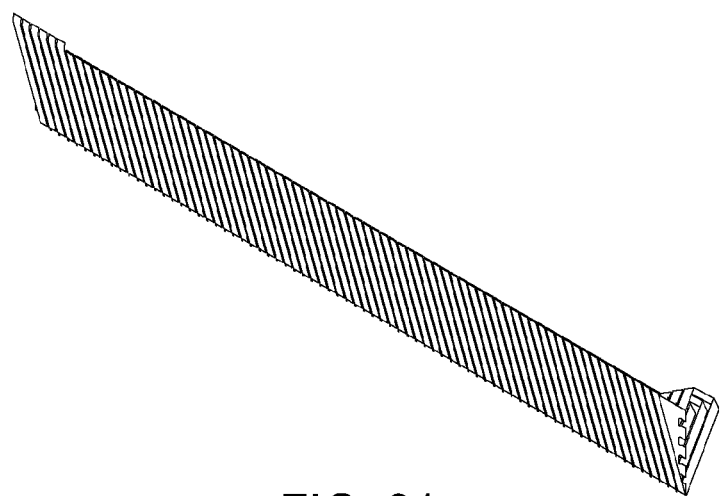
FIG. 21 illustrates a perspective view of a flat form of wave winding bobbin wound with three Litz wire bundles.

FIG. 21 illustrates a perspective view of the flat form of the bobbin 105 wound with three Litz wire bundles, one for each of a three-phase winding stator 100, corresponding to the illustration in FIG. 7. In an embodiment, the Litz (or other type) wires are wound at an angle determined by the short dimension of the bobbin 105 and the pole pitch, the width of the wire bundles, and the number of phases (e.g., three-phase) that determines the number of wire bundles on the bobbin 105. The rotor magnet pole faces may be sized accordingly. Referring to FIG. 21 and FIG. 7, it is seen that all electrical connections are made to a pair of first and second wire terminations at the ends of each wire bundle, which for a three-phase winding is six terminations, shown at the left end of the flat form of the bobbin 105. Each wire bundle is folded over, as shown at the right end of the flat form of the bobbin 105 to form a return path to the second termination, and the three wire bundles are interleaved, so that overlapping of the wire bundles occurs only at one end of the flat form of the bobbin 105 (shown in FIG. 21 at the right end) so that the overlapping and path reversal takes place off the edge of the bobbin 105, but on the same side of the flat form, as shown, and furthermore, does not take place within the high density magnetic fields between the magnet pole faces on the rotor. With this configuration, therefore, an excess length of wires required to connect between each of the two flat surfaces of the bobbin is kept to a minimum, thereby reducing excess resistance that would occur if turning and overlapping of the wires took place on one side of the bobbin 105 each time the wires reversed direction.

As indicated above, in a three-phase motor or generator, or other multi-phase electromechanical power converter, there may be three bundles 110 of wires wound in a 120° phase shifted pattern around the bobbin corresponding to the magnet arrangement on the rotor as described below. Optionally, there may be more than one wire bundle 110 for each phase.

Figure 24:
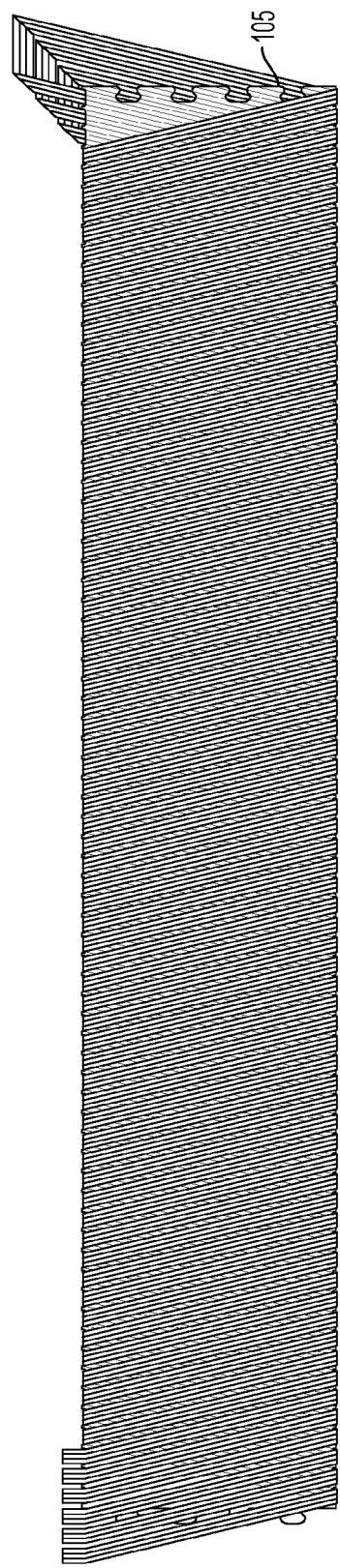
FIG. 24 illustrates a third phase added adjacent and between the second and first phase windings of FIG. 23.

FIG. 22 is an illustration of a first phase of a three phase stator where a multiplicity of wire bundles (e.g., three wire bundles in the figure) wound on the flat form of the bobbin. FIG. 23 illustrates the second phase added adjacent to the first phase. FIG. 24 illustrates the third phase added adjacent and between the second and first phases. Terminations are shown, for example, at the left upper edge of the bobbin, and the crossover return loops are shown at the upper right edge of the bobbin. In the example illustrated, all wires slanting from upper left to lower right are shown on the front surface of the bobbin, and all wires slanting from lower left to upper right are shown on the back surface of the bobbin, as viewed. The spacing and slant corresponds to the size and spacing of rotor magnet pole faces to provide three phases of induction 120° apart.

Returning to FIG. 1, the cylindrical structure 105 is configured with a phase ring 107 which provides electrical connection to each individual bundle 110. In a three-phase motor or generator, there may consequently be three individual bundles 110, as described above.

Figure 25:
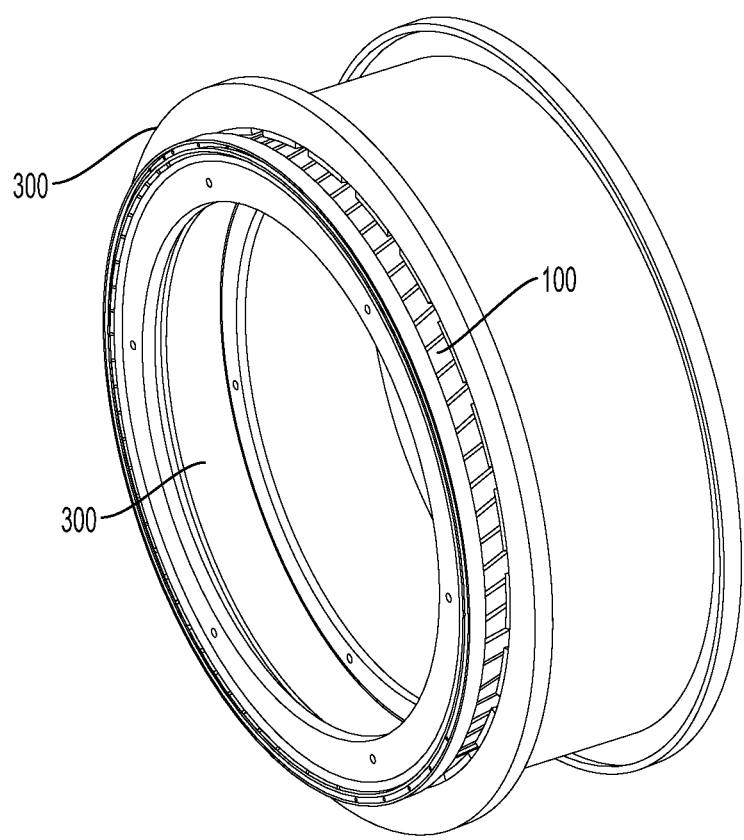
FIG. 25 illustrates a representative assembly of a rotor and stator.

FIG. 25 illustrates a representative assembly of a rotor 300 and stator 100, such as may be used in an electric motor or an electric generator.

The rotor 300 may include a single assembly of permanent magnets (not shown) on either an interior or exterior wall of the cylindrical stator 100, and may have an assembly of either permanent magnets or field return elements (not shown) facing the opposing wall of the cylindrical structure 100.

Referring to FIG. 21, it can be seen that there is substantially no excess wire in end turns at the edges of the bobbin where the wires are wound over from front to back of the planar bobbin. This results in the wire conductors being configurable entirely within the magnetic field flux region of the rotor (with the exception of the cross-over turnarounds at one end of the planar bobbin and the ends of the wire conductors at the other end). It may be appreciated that in such a configuration, the resistivity due to the length of the wire conductors is minimized by the elimination of additional wire required for turnings and crossovers of multiphase wire arrangements each time the wire conductors reach the edges of the bobbin. The absence of such turnings and crossovers reduces the overall volume of the stator as compared to conventional winding arrangements for configuring wires in stators. Furthermore, a larger mass fraction of wire is configured within the magnetic field flux region, thus providing more efficient arrangement of the wire conductors for force induction.

In an embodiment of the disclosure, a method 2600 of assembling a stator is described with reference to FIG. 26. The method 2600 of assembly begins at block 2610, in which the proper bobbin (e.g., wave, chevron, lap, etc.) is fabricated as a flat form (see FIG. 12) or in cylindrical form and arranged for wire wrapping. The bobbin may be machined, stamped or cut from suitable material. In block 2620 a plurality of wires (which may be Litz wires, as shown, or other wires or metal tape), corresponding to the number of multiples per phase and each phase, are wrapped around the bobbin (see FIG. 21), where the bobbin is arranged flat or in cylindrical form, and with the wires being guided by tabs located at a top and bottom edge of the bobbin (shown in the detail in FIG. 20). The bobbin and wire wrap configuration may be pressed together, with the wires wrapped with a minimum of slack. Preferably, the wires are machine wrapped on the bobbin for uniform tension, flatness and alignment. In block 2630 a fiber tape or woven cloth may be first wrapped around a cylindrical mandrel before placing the wire wrapped bobbin on the mandrel to form a wire wrapped cylinder. In block 2640 the wire wrapped bobbin is placed on a cylindrical mandrel, where the mandrel is selected to match the dimensions of the bobbin such that the two ends of the bobbin mate properly so that the angular phase relationship is continuously uniform around the circumference of the now cylindrically arranged bobbin.

In block 2650 the bobbin wire-coil combination is wrapped with a fiber strand or tape, which may be made, for example, of fiberglass. The tape provides compression of the bobbin-wire coil structure against the surface of the cylindrical mandrel and structural rigidity of the cylindrical wire-wrapped bobbin. In block 2660 the entire assembly is enclosed in a mold encasing the bobbin and mandrel, leaving an amount of gap on the inner and outer surfaces of the bobbin-wire-fiberglass composite structure for introduction of a curable liquid potting material, which may be an epoxy resin, which is then cured to form a self-supporting composite structure. After curing, the composite structure is ejected from the mandrel (block 2670). Mold release compounds, well known in the art of epoxy composite fabrication, may be used to aid in release from the mold and mandrel. In block 2680, the phase ring is installed to enable electrical contact to each wire conductor, or wire bundle, and to provide a mating assembly for completing the construction of a motor or generator.

The bobbin may be porous to permit the potting material to substantially infuse around and through the wire bundles 110, the wrapping tape and the bobbin, reinforcing the structural rigidity of the stator as a composite structure when cured. The composite construction of the stator may enhance the ability of the stator to withstand turn-to-turn voltage changes and forces generated when subject to electromagnetic induction.

The stator and rotor may then be assembled in additional steps to complete a generator or motor.

Figure 26:
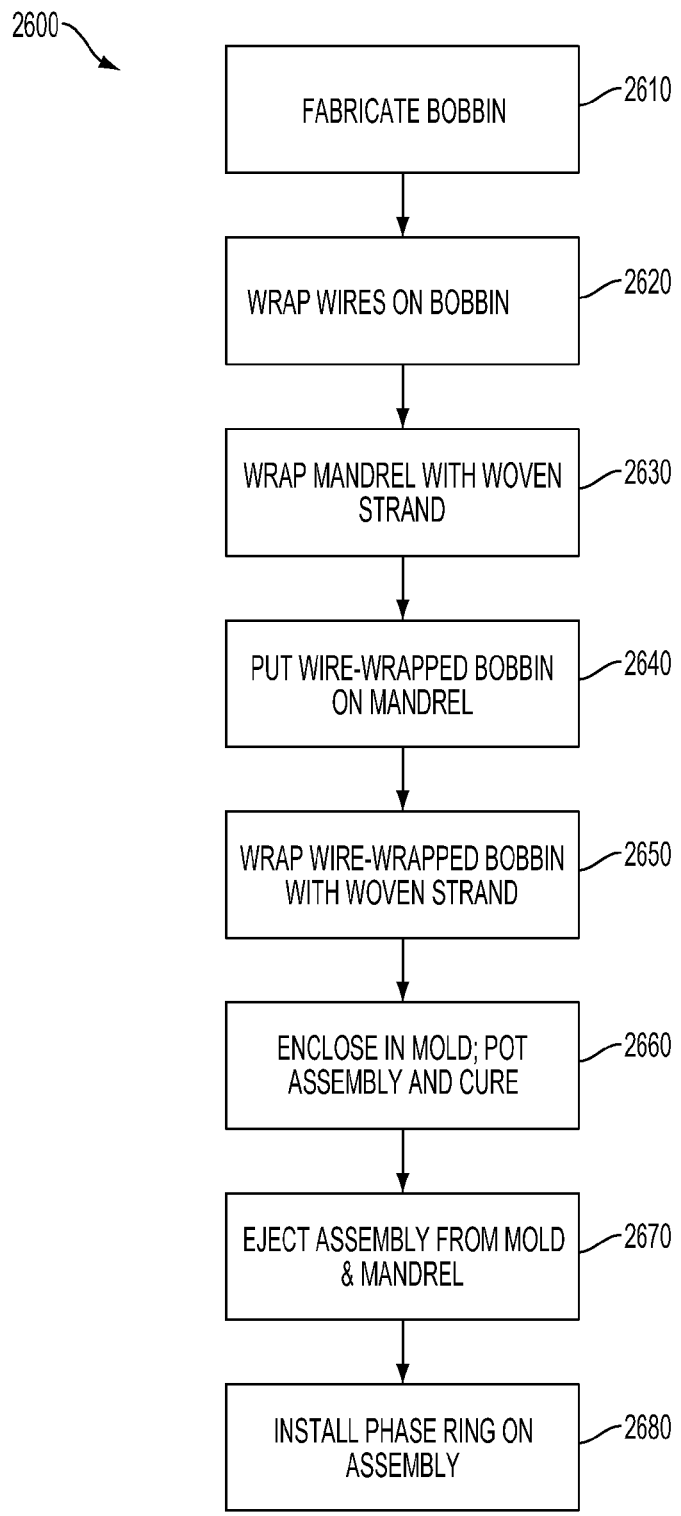
FIG. 26 illustrates a method of assembling a composite stator in accordance with the disclosure.
Figure 27:
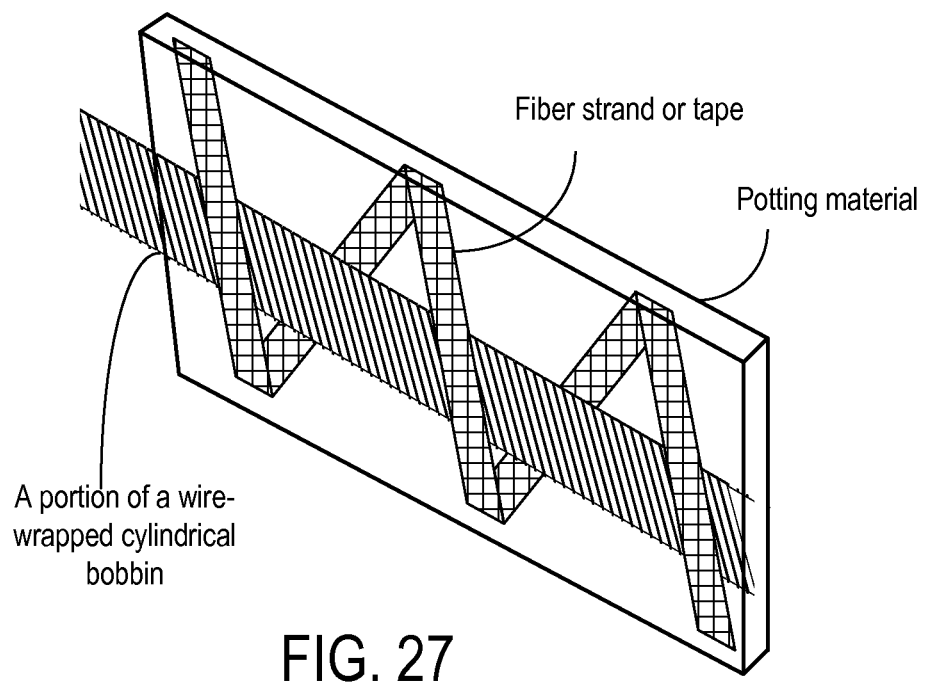
FIG. 27 illustrates a composite stator in accordance with the method of FIG. 26.

FIG. 27 illustrates a composite stator in accordance with the method of FIG. 26. A portion of wire-wrapped cylindrical bobbin is shown (block 2640 of FIG. 26). A fiber strand or tape (which may be made of fiberglass) wound on at least one of the inner and outer surfaces of the wire-wrapped cylindrical bobbin (block 2650 of FIG. 26). The fiber strand or tape wound around a portion of the at least one wire on the outer surface of the cylindrical bobbin. Potting material pots the wire-wrapped cylindrical bobbin (block 2660 of FIG. 26). A portion of the at least one wire is located between the cylindrical bobbin and the potting material.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus comprising:
    an ironless composite stator coil comprising a composite structure, wherein the composite structure comprises:
        a wire-wrapped cylindrical bobbin, comprising:
            a cylindrical bobbin having an inner surface and an outer surface; and
            at least one wire wrapped around both the inner and outer surfaces of the cylindrical bobbin; and
        a cured potting material potting the wire-wrapped cylindrical bobbin, wherein the composite structure has a rigidity reinforced by the cylindrical bobbin to withstand turn-to-turn voltage changes, and
        wherein the composite structure further comprises an inner surface and an outer surface; further comprising a first layer of one or more fiber strands wound on the inner surface of the composite structure and a second layer of one or more fiber strands wound on the outer surface of the composite structure.

2. The apparatus of claim 1, wherein the at least one wire comprises a wire bundle, a Litz wire bundle, an individual wire, or a wire tape.

3. The apparatus of claim 1, wherein the apparatus is a motor configured to be driven by current supplied to the at least one wire.

4. The apparatus of claim 1, wherein the apparatus is a generator configured to provide current from the at least one wire.

5. The apparatus of claim 1, wherein the potting material penetrates the wire-wrapped cylindrical bobbin.

6. The apparatus of claim 1, wherein the potting material comprises at least one of epoxy and resin.

7. The apparatus of claim 1, wherein the at least one wire is toroidally-wrapped around the cylindrical bobbin.

8. The apparatus of claim 1, further comprising a magnetic rotor arranged with the ironless composite stator coil.

* * * * *